(12) United States Patent
Morgan

(10) Patent No.: US 6,513,022 B1
(45) Date of Patent: Jan. 28, 2003

(54) DYNAMIC PROGRAMMING NETWORK

(75) Inventor: James S. Morgan, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/545,712

(22) Filed: Apr. 7, 2000

(51) Int. Cl.[7] ............................................. G06F 15/18

(52) U.S. Cl. ........................ 706/16; 706/25; 706/19; 706/12

(58) Field of Search .......................... 706/12, 16, 19, 706/25, 20

(56) References Cited

U.S. PATENT DOCUMENTS

| | | | |
|---|---|---|---|
| 5,195,167 A | 3/1993 | Bahl et al. | 704/200 |
| 5,416,889 A | 5/1995 | Takahashi et al. | 706/19 |
| 5,452,400 A | 9/1995 | Takahashi et al. | 706/19 |
| 5,608,843 A | 3/1997 | Baird, III | 706/25 |
| 5,644,681 A | 7/1997 | Takahashi et al. | 706/25 |
| 5,689,622 A | 11/1997 | Higashino et al. | 706/25 |
| 5,727,081 A | 3/1998 | Burges et al. | 382/229 |
| 5,857,178 A | 1/1999 | Kimura et al. | 706/41 |
| 5,946,673 A | * 8/1999 | Francone et al. | 700/246 |
| 6,023,693 A | 2/2000 | Masuoka et al. | 706/25 |
| 6,353,814 B1 | * 3/2002 | Weng | 700/258 |

OTHER PUBLICATIONS

Mizutani, E., Sample Path–Based Policy–Only Learning By Actor Neural Networks, International Joint Conference on Neural Networks, Jul. 1999, vol. 2, pp. 1245–1250.*

Berenji, H., Fuzzy Q–Learning: A New Approach for Fuzzy Dynamic Programming, Proceedings of the 3rd IEEE Conference on Fuzzy Systems, Jun. 1994, vol. 1, pp. 489–491.*

Horiuchi et al., Q–PSP Learning: An Exploitation–Oriented Q–Learning Algorithm and Its Applications, Proceedings of the IEEE International Conference on Evolutionary Computation, May 1996, pp. 76–81.*

Bersini et al., Three Connectionist Implementations of Dynamic Programming for Optimal Control: A Preliminary Comparative Analysis, Int'l Workshop on Neural Networks for ID, Control, Robotics and Signal/Image Processing, Aug. 1996, pp. 428–437.*

Bertsekas, D.P., New Value Iteration and Q–Learning Methods for The Average Cost Dynamic Programming Problem, Proceedings of the 37th IEEE Conference on Decision and Control, Dec. 1998, vol. 3, pp. 2692–2697.*

(List continued on next page.)

*Primary Examiner*—Thomas Black
*Assistant Examiner*—Kelvin Booker
(74) *Attorney, Agent, or Firm*—Gina S. Tollefson; Gerald B. Hollins; Thomas L. Kundert

(57) ABSTRACT

A dynamic programming network integrating sensor management, sensor fusion, and an application in a seamless structure in which these functions are mutually dependent and develop autonomously and concomitantly with experience. The dynamic programming network autonomously divides these functions into multiple subtasks that it can assign to the processors of a fine-grained parallel computer. As the number of processors available for these subtasks increases the network may attain its objective more efficiently. This architecture confers the greatest advantage in feature-rich applications such as identification of targets in synthetic aperture radar, visual, and infrared images. The design can be extended, however, to such diverse and general applications as control problems and machine intelligence. For the pattern recognition applications, the dynamic programming network detects, selects, and identifies features and patterns comprising those features via a series of observations rather than processing all data available in each image, thereby minimizing sensor usage and volume of data processed. The network remembers similar features contained in many images instead of many images containing similar features, thus conserving memory and facilitating data retrieval.

17 Claims, 4 Drawing Sheets

OTHER PUBLICATIONS

Schoknecht et al., Search Space Reduction for Strategy Learning in Sequential Decision Processes, Proceedings of the 6th International Conference on Neural Information Processing, Nov. 1999, vol. 1, pp. 148–153.*

McDonald et al., Approximate Discounted Dynamic Programming Is Unreliable, The University of Bestern Australia Dept of Computer Science, Oct. 1994.*

Schneider, J.G., Exploiting Model Uncertainty Estimates for Safe Dynamic Control Learning, Advances in Neural Information Processing Systems, The MIT Press, 1996, vol. 9, pp. 1047–1055.*

Dubrawski et al., Memory Based Stochastic Optimization for Validation and Tuning of Function Approximators, 6th Internationa Workshop on AI and Statistics, Jan. 1997.*

Wiering et al., HQ–Learning, NEC Research Index, 1997, Retrieved from the Internet: http://citeseer.nj.nec.com/article/wiering97hqlearning.html.*

Utgoff et al., Relative Value Function Approximation, University of Massachusetts Department of Computer Science, Jan. 1997, Technical Report 97–03, Retrieved from the Internet: http://citeseer.nj.nec.com/utgoff97relative.html.*

Hagen et al., Generalizing i TD(lamda) learning, Proceeding of the 3rd Joint Conference on Information Sciences, 1997, vol. 2, pp. 319–322.*

Boyan et al., Generalization in Reinforcement Learning: Safely Approximating the Value Function, Advances in Neural Information Processing Systems 7, MIT Press, 1995, pp. 369–376.*

Dietterich, T.G., Machine Learning, ACM Computing Surveys, Dec. 1996, vol. 28, Iss. 4es.*

Guo et al., A Neural–Network Q–Learning Method for Decentralized Sequential Detection with Feedback, International Joint Conference on Neural Networks, Jul. 1999, vol. 4, pp. 2288–2291.*

Holland et al., Q–Learning with Generalisation: An Architecture for Real–World Reinforcement Learning in a Mobile Robot, International Joint Conference on Neural Networks, Jun. 1992, vol. 1, pp. 287–292.*

Esogbue et al., A Reinforcement Learning Fuzzy Controller for Set–Point Regulator Problems, Proceedings of the 5th IEEE International Conference on Fuzzy Systems, Sep. 1996, vol. 3, pp. 2136–2142.*

Saul et al., Markov Decision Processes in Large State Spaces, Proceedings of the 8th Annual Conference on Computational Learning Theory, 1995, pp. 281–288.*

Schoknecht et al., Search Space Reduction for Strategy Learning in Sequential Decision Processes, 6th International Conference on Neural Information Processing, Nov. 1999, vol. 1, pp. 148–153.*

* cited by examiner

DYNAMIC PROGRAMMING NETWORK

RIGHTS OF THE GOVERNMENT

The invention described herein may be manufactured and used by or for the Government of the United States for all governmental purposes without the payment of any royalty.

BACKGROUND OF THE INVENTION

The field of the invention relates to dynamic programming and more specifically to dynamic programming within a network structure.

Dynamic programming is a process that discovers an optimal trajectory toward a goal by deriving values of states encountered during exploration from values of succeeding states. The various forms of dynamic programming such as Q-learning, TD-Lamda, value iteration, and advantage learning often require extensive exploration and large amounts of memory for maintaining values for the vast number of states typically encountered in useful applications.

Function approximators, such as neural networks, can be used in the art to mitigate the memory liability associated with most forms of dynamic programming and afford good performance with the experience of just a small sample of all possible states. The dynamic programming network offers an alternative or collateral strategy by intelligently directing sensors toward regions of interest within a state, processing and retaining only information that contributes to the achievement of an objective. An experienced dynamic programming network may therefore considerably reduce the amount of exploration necessary to arrive at an optimal or good-enough solution.

Current methods for identifying military targets usually attempt to match a target with images stored within a database. Usually the database is quite large and contains real or synthetic images of the same target in as many orientations, configurations, and articulations as possible. Not all variations can be anticipated and insignificant variations can hinder finding a match. Military applications require considerably more time searching for a match than the duration of a mission and, because of the size of the database, processing cannot be performed aboard a tactical aircraft. The dynamic programming network of this invention conserves memory and processes image data with profound speed when implemented on the fine-grained parallel computers for which it was designed.

Sensor management, sensor fusion, and target recognition are seldom integrated well and are at best essentially independent software modules that only exchange data. The few modules known to adapt do so almost independently of the requirements of these other functions. Further, experts generally handcraft these functions so they are tailored to a specific environment, rendering the functions rigid in their application. The dynamic programming network integrates these functions seamlessly.

The present invention may be accurately described as a dynamic programming network. It cannot compare directly with known error-backpropagation neural networks because the error that back-propagates in such neural networks derives from a known desired response whereas a dynamic programming network must discover an unknown desired response after a lengthy trial and error search of states. The present invention allows for the possibility of a dynamic programming network using a function approximator to maintain the elements' state values to learn to accept via its sensors an error or desired response.

The dynamic programming network conserves memory and processes image data with profound speed. The method of the invention is not rigid to a specific application but can be used in a wide variety of applications with minimal tailoring.

SUMMARY OF THE INVENTION

The dynamic programming network integrates sensor management, sensor fusion, and an application in a seamless structure in which these functions are mutually dependent and develop autonomously and concomitantly with experience. The dynamic programming network autonomously divides these functions into multiple subtasks that it can assign to the processors of a fine-grained parallel computer. As the number of processors available for these subtasks increases the network may attain its objective more efficiently. This architecture confers the greatest advantage in feature-rich applications such as identification of targets in synthetic aperture radar, visual, and infrared images. The design can be extended, however, to such diverse and general applications as control problems and machine intelligence. For the pattern recognition application described here, the dynamic programming network detects, selects, and identifies features and patterns comprising those features via a series of observations rather than processing all data available in each image, thereby minimizing sensor usage and volume of data processed. The network remembers similar features contained in many images instead of many images containing similar features, thus conserving memory and facilitating data retrieval.

It is therefore an object of the invention to provide an efficient, memory conserving dynamic programming system and method.

It is another object of the invention to provide an infinitely scalable dynamic programming network.

It is another object of the invention to provide a dynamic programming network that integrates sensor management, sensor fusion and an application in a seamless structure in which these functions are mutually dependent and develop autonomously and concomitantly with experience.

These and other objects of the invention are described in the description, claims and accompanying drawings and are achieved by an efficient, memory conserving, application integrating dynamic programming method comprising the steps of:

establishing a prototype element of a network, said establishing comprising the steps of:
assigning a table or function approximator for maintaining state values;
identifying a method for determining element state based on state values maintained from said assigning step;
applying a process for dynamically programming said element's state values based on succeeding state values resulting from said element's state from said identifying step;
connecting a plurality of elements from said establishing step to form a network;
coupling signal transmitting sensors to elements from said connecting step;
coupling elements from said connecting step to effectors;
maintaining within each element a running average of values for the state of an element in a cycle after such value occurs;

cycling said network by determining the state of all elements and sensors therein, selecting as each element's state the highest running average value from said maintaining step;

sending an output signal to network effectors; and presenting to said sensors a pattern based on a state that results from effector activity from said sending step.

DETAILED DESCRIPTION

The dynamic programming network of the present invention offers an alternative strategy for maintaining values for the vast number of states that exist in dynamic programming. The invention divides a task into an arbitrarily large number of subtasks, one subtask for each agent in the network, and efficiently utilizes parallel computational resources by intelligently directing sensors toward regions of interest within a state, processing and retaining only information that contributes to the achievement of an objective. This strategy minimizes sensor usage and volume of data processed and conserves memory.

Figure 1:
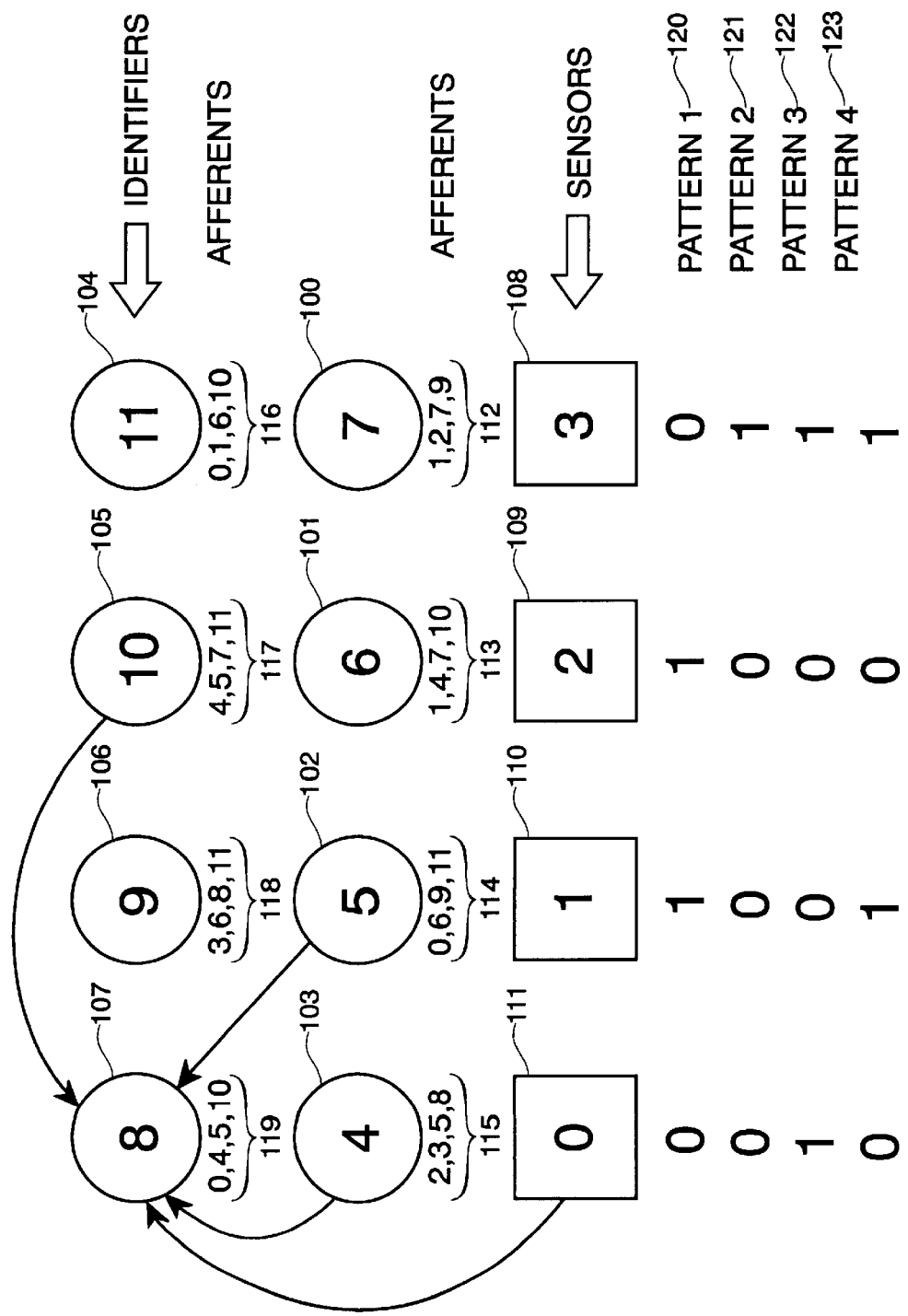
FIG. 1 illustrates a dynamic programming network of the invention that can identify four fully observable four-bit patterns.

The dynamic programming network of the present invention is infinitely scalable in the sense that as many elements as desired may be networked with generally increasing functionality. Although any number of inputs can be processed, the invention is best illustrated by an example involving a small number of inputs. In the context of the present invention, an afferent refers to sensors or network elements that provide an input to a network element; an efferent refers to a network element that receives the output of a sensor or network element. FIG. 1 shows a simple dynamic programming network of eight elements and four sensors that can identify each of four fully observable four-bit patterns and demonstrates the structure and function of the invention. The eight elements of the network arrangement of FIG. 1 are represented at 100–107. Network sensors in the arrangement of FIG. 1 are represented at 108–111. The afferents in the FIG. 1 arrangement of the invention are shown at 112 through 119. The number of sensors used is determined by the application and by available computational resources; employing fewer sensors than required to determine state unambiguously necessitates a multiple-look strategy on the part of the network and is likely to entail a network comprising a greater number of elements.

In FIG. 1, each element's afferents are listed by number below it. For example, the afferents of element 8 at 107 include sensor 111, elements 4 and 5 at 103 and 102, respectively, and element 10 at 105. The number of sensors and elements selected for the arrangement of FIG. 1 is illustrative only; any number of elements or sensors is possible.

The network is constructed by assigning to each element at least two afferents; each element is by definition an efferent of those afferents assigned to it. An afferent to an element, therefore, can be an efferent of another element. These element-to-element connections provide the feedback required to capture the dynamics of the system. That is, because of the delays inherent in a network in which the elements have only partial state information and because the network or any subset of the network can act upon its sensors, its effectors, the cycling times of its elements, the assignment and deletion of afferents among elements within the network, the number of elements within the network, and the state of the application or task, communication among the elements is essential for performing any task coherently.

An element's afferents may be either preselected or random, depending on the application. Afferents may be preselected when some knowledge of the application or its solution indicates a particular grouping of afferents may facilitate the training or performance of the network. Preselection is especially indicated when a network that already exhibits a desired behavior is to be duplicated in a second naive network. In this case, state values associated with the preselected afferents may also be assigned. Random assignment is useful because it is an unbiased and automatic method for assigning afferents, relieving the user of tedious assignation by hand. Random assignment generally operates by numbering uniquely, starting with zero, the sensors and elements in the system. Generate either from a table, programming language library routine, or other method a pseudorandom number between 0.0 and 1.0. Multiply the total number of sensors and elements by the number generated to get the number of an afferent. Round fractional parts in a manner that ensures each element and sensor has an equal probability of being selected. Do this as many times as necessary to obtain the number of afferents desired for each element in the network.

The number of states of an element or sensor is limited only by the computer memory available, but for simplicity, only two states, arbitrarily called 0 and 1, are used in the illustration of FIG. 1. Determination of the states of all elements and sensors in the network constitutes a cycle.

Figure 2:
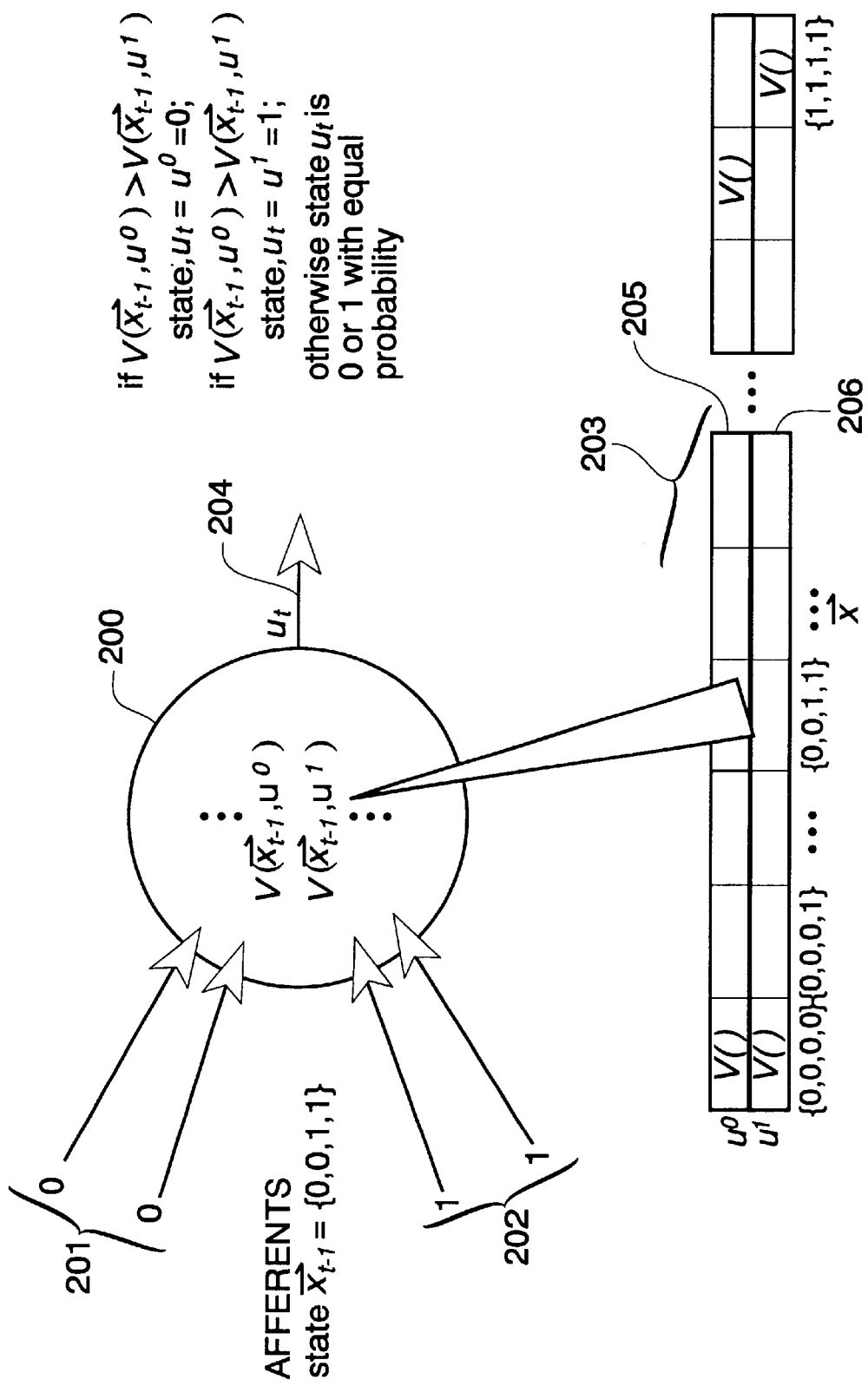
FIG. 2 shows a single element of the FIG. 1 dynamic programming network.

For further illustration, a single element of the dynamic programming network is shown in FIG. 2. The single element is represented at 200 with inputs from its afferents shown at 201 and 202. In this example the states of the afferents have been assigned the values 0, 0, 1, and 1. The states of the element's afferents on the previous cycle comprise the afferent state vector $\vec{x}_{t-1}$. The output of element 200 is represented at 204. State values associating the inputs of element 200 with the output of element 200 can be maintained by the table shown at 203; when necessary the states may be maintained by a neural network or other function approximator. For every combination of states of its afferents $\vec{x}$ it encounters, an element maintains a running average of dynamically programmed values $V(\vec{x}_{t-1}, u_t)$ for the state $u_t$ of the element in the cycle after that combination occurred. When an element's afferents assume a particular combination of states the element may compare the values associating that combination with each of the element's states to determine the element's state with the greater value. Generally, but not always, the element takes the state with the higher value because the state with the higher value is the state that is likely to yield the greatest reward discounted for time and cost and is said to be policy for the element. If multiple states have the same highest value the element takes its state at random from among those states. However, training may be facilitated if the element explores the task by taking states other than that with the higher value. The state the element takes is the state $U_t$ of the element in the current cycle.

For the illustration of FIGS. 1 and 2, table 203 illustrates one method for maintaining state values in FIG. 2. In this illustration, table 203 has two rows and several columns. Each column of table 203 corresponds to a different combination of states of the element's afferents. Each row of table 203 corresponds to a different state of element 200. Each cell of the table may contain a value for one of the states of element 200 given a particular combination of states of the element's afferents.

For every combination of states of its afferents it encounters, an element maintains a running average of dynamically programmed values, V, for the state of that element in the cycle after that combination occurred, shown in the cells of table 203 in FIG. 2. For example, for a small positive (e.g., 0.001) learning rate α and averaging factor β (e.g., 1-α) this value (V) is updated on cycle τ to be the sum of the product of β and itself and the product of α and the sum of the costs (q and penalties (P) levied, rewards (R) conferred, and the discounted (γ) highest value (max V) among the element's possible states ($u$) on the next cycle for the current combination of states of its afferents. This can be expressed mathematically as:

$$V(\vec{x}_{t-1}, u_t) \Leftarrow \beta V(\vec{x}_{t-1}, u_t) + \qquad \text{Eq. 1}$$
$$\alpha \left( C(\vec{x}_{t-1}, u_t) + P(\vec{x}_{t-1}, u_t) + R(\vec{x}_{t-1}, u_t) + \gamma \max_u V(\vec{x}_t, u_{t+1}) \right)$$

The costs levied, C, refer to the effort expended to move from one task state to another. For example, driving to work entails costs for fuel and parking that detract from wages earned at work.

The Penalties, P, and Rewards, R, refer to values assigned to or averaged with existing values of the states of network elements for failure or success in achieving goals or subgoals in the course of completing the task. For example, winning a game may result in a reward of one hundred dollars whereas losing may result in a penalty of eight hundred dollars. For all network elements or a subset thereof, these values may be assigned to a function approximator or to the cell in table 203 of FIG. 2 corresponding to the current state of each network element and the states of its affernets on the previous cycle. The network of this invention allows for the possibility, not expressed in equation 1, that these values may also be averaged with existing values within the function approximator or appropriate cell of the table.

At the beginning of the demonstration of FIGS. 1 and 2, all states and state values are zero. Whereas a cycle constitutes a determination of the states of all elements and sensors in the network, for this demonstration a trial consists of one or more cycles in which one pattern selected at random from the four patterns in the demonstration set is presented to the network. As illustrated in FIG. 1, the patterns are shown at 120 through 123. Looking again to FIG. 1, each of the four sensors, 108 through 111, corresponds uniquely to one of the four bits in the presented pattern and every cycle reports to its efferents the state of the pattern bit it represents. A trial ends when the network attempts to identify the pattern.

Many ways exist for interpreting network responses. For the illustration of FIG. 1, each of four elements randomly selected a priori corresponds uniquely to one of the four patterns in the test. These four elements, which for the purpose of this illustration may be called identifiers, are coupled to the effectors of the network. Network effectors need not be limited to acting upon the state of the task or application as they are in this illustration. Network effectors may add, alter, or remove afferents of any of the elements in the network, add, alter, or remove network elements, add, alter, reorient, or remove sensors and effectors, and change cycling times of network elements. For this illustration, the network effectors act on the state of the application by declaring the identity of the presented pattern in the following manner. The network identifies a pattern when, of the four identifiers, the state of only the one corresponding to the presented pattern is 1, whereupon the value of the final state of each element in the network is set equal to a reward value (e.g., 1.0). The network misidentifies a pattern when, of the four identifiers, the state of only one not corresponding to the presented pattern is 1, whereupon the value of the final state of each element in the network is set equal to a penalty value (e.g., −8.0). The trial continues to the next cycle if the state of none or more than one of the identifiers is 1. Additionally, to limit the number of cycles per trial a processing cost (e.g., −0.01) can be levied against the value of the state of each element on all but the final cycle. The demonstration of FIG. 1 employs no discounting (γ is 1.0).

Figure 3:
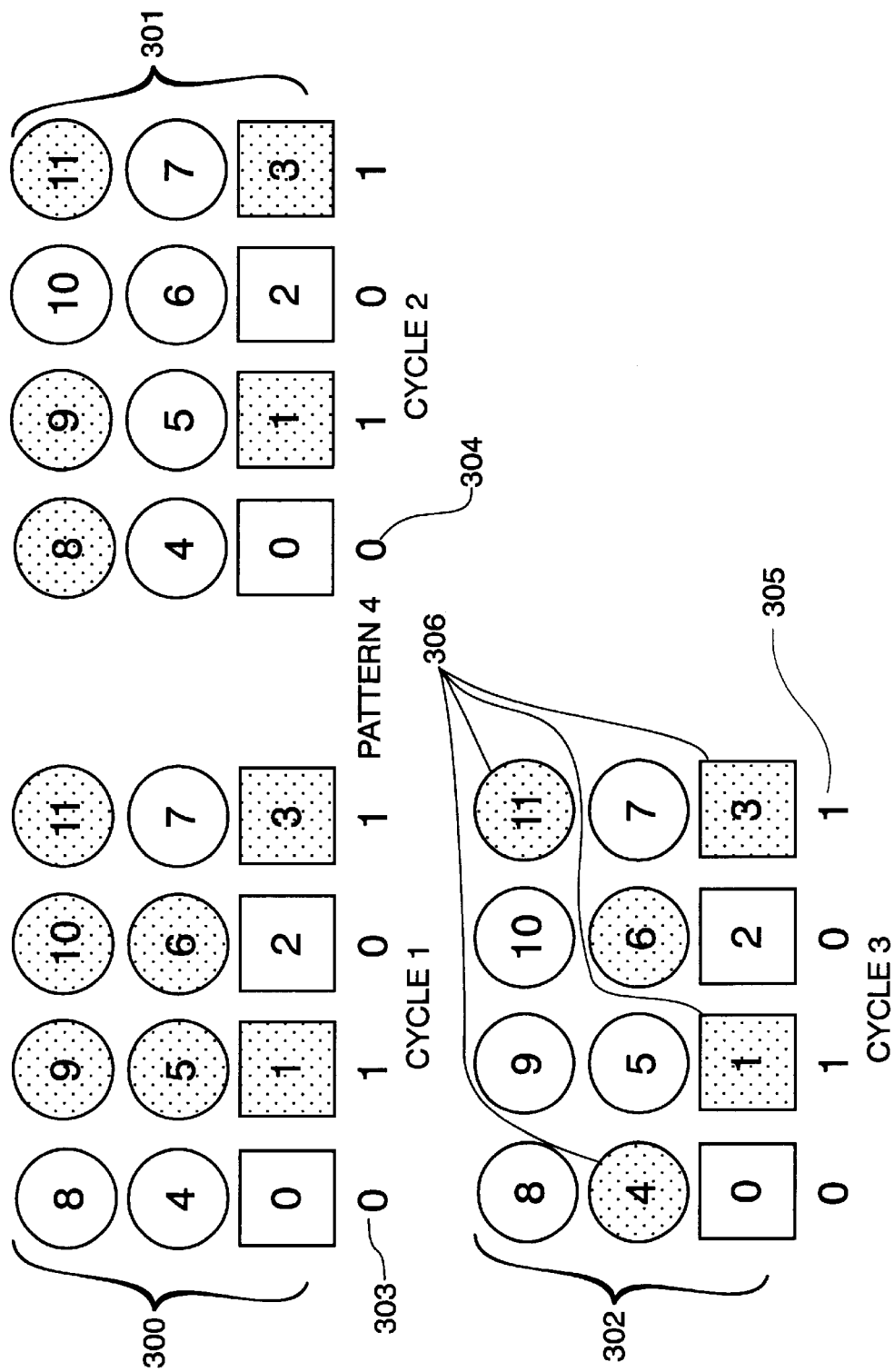
FIG. 3 illustrates a training concept of the FIG. 1 dynamic programming network.

The network may then engage in a training exercise, the training concept of the invention illustrated in FIG. 3 of the drawings. A training exercise operates to establish the correct values for all states encountered during the identification task. Continuing with the arrangement of FIGS. 1 and 2, three cycles of a single trial are illustrated at 300, 301 and 302 in FIG. 3. In each of the three cycles, 300, 301 and 302, elements and sensors in state 1 are identified by a dotted pattern, pointed out at 306. Cycles 300, 301 and 302 illustrate the network looking at pattern 4, first illustrated at 123 in FIG. 1. After training for about 500 trials, three cycles per trial suffice for identifying the four patterns. FIG. 3 illustrates that for each cycle 300, 301 and 302 pattern four is presented to the network at 303, 304 and 305, respectively. In cycle 3 at 302, the only identifier in state 1 is element 11, correctly declaring the presented pattern as pattern 4.

Because one identifier has no afferent sensor and only one identifier has two, to declare the identity of any of the patterns each of the identifiers must rely on information encoded and communicated over the course of multiple cycles by other elements in network about the states of the remaining sensors and the other identifiers. This is a significant aspect of the invention. This communication is accomplished with each of the network elements taking the state that has the higher value given the state of its afferents in the previous cycle. This ability to retain information as communication within the network over several cycles is essential for accomplishing pattern identification with multiple looks. Information collected from earlier looks must cycle within the network until subsequent looks provide sufficient information to compose an identification.

Consider a network that in one cycle can see only a small part of the pattern presented. A network larger than that illustrated in FIGS. 1–3 that in one cycle can see only four of the twenty bits in the presented pattern is able via multiple looks to distinguish seven patterns, some of which differ in only one or two bits. Patterns which are quite dissimilar would be distinguishable with one look and would therefore not exercise the multiple look feature of the network of the invention.

Figures 4A, 4B:
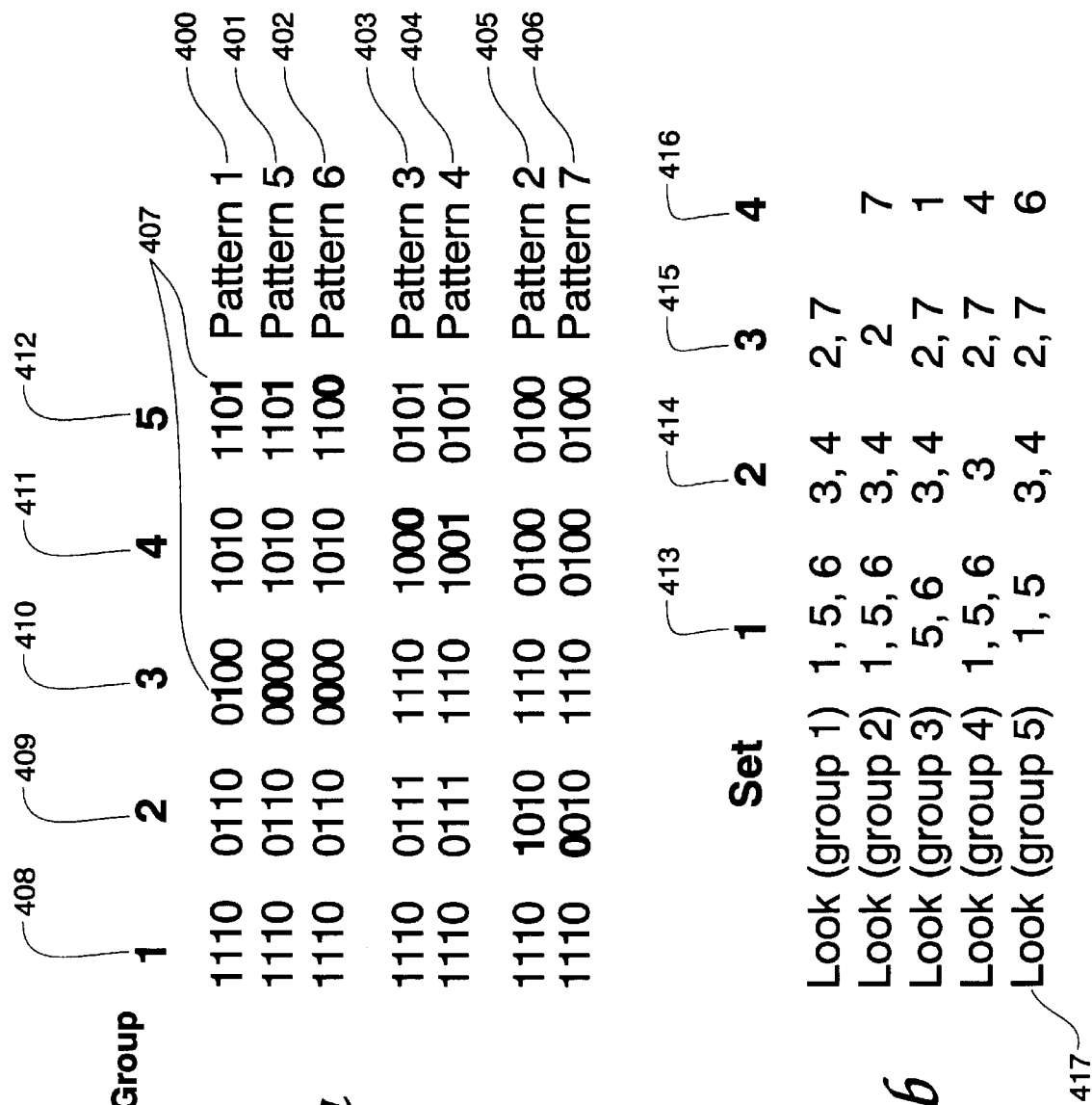
FIG. 4a illustrates seven 20-bit patterns that a network according to the invention identified with multiple looks.
FIG. 4b illustrates the separation of patterns from FIG. 4a into three or four sets.

FIGS. 4a and 4b illustrate the multiple look feature of the network of the invention. The larger network applied to the task of FIG. 4 is similar to the smaller network illustrated in FIGS. 1–3 except that the network comprises 79 elements with 11 afferents per element. FIG. 4a illustrates seven 20-bit patterns, shown at 400–406, that a network according to the invention identified with multiple looks. In FIG. 4a, the patterns grouped together are similar. Patterns 1, 5 and 6 at 400, 401 and 402, respectively, are similar. Patterns 3 and 4 at 403 and 404 are similar and patterns 2 and 7 at 405 and 406 are also similar. Bits rendered in bold, two of which are shown at 407 from pattern 1 at 400, distinguish a pattern from similar patterns. The sensors can look at one of the five 4-bit groups, shown at 408–412 in FIG. 4a, of the presented pattern per cycle.

FIG. 4b illustrates the aspect of the multiple look feature which looks at the 4-bit groups 408–412 in FIG. 4a and separates the patterns into three or four sets. The sets are illustrated at 413–416 in FIG. 4b. Each pattern in a set is identical for the 4-bit group observed. For example, looking at the fifth group of bits, such look represented at 417 in FIG. 4b, leaves at most 2 possibilities for the pattern presented. That is, if the pattern is 1 or 5 (set 1 at 413), looking next at group three disambiguates those patterns. If the pattern is 3 or 4 (set 2 at 414), looking next at group four suffices. If the pattern is 2 or 7 (set 3 at 415), looking next at group two suffices. If the pattern is 6 (set 4 at 416), the four bits in group 5 are unique to the pattern in the set, rendering a second look unnecessary.

In the illustration of FIG. 4, a cost of −0.03 is imposed every cycle for processing, a cost of −0.07 is imposed every cycle in which the sensor is active, and the binary states of the four identifiers are multiplexed to determine network response, i.e., the network response is the sum of the state of one of the identifiers multiplied by 8, the state of a second multiplied by four, the state of a third multiplied by two, and the state of the fourth. A result of 1 through 5 either directs the sensors to report the first, second, third, fourth, or fifth set of four bits of the presented pattern or deactivates the sensor if it had been active on the same set of bits the previous cycle. A result of 6 through 12 declares the identity of the presented pattern to be patterns 1 through 7, ending the trial. A result of zero or 13, 14, or 15 continues the trial to the next cycle leaving the sensor unchanged.

After training for 226,000 trials the network can identify the patterns. In this demonstration the network looks at the fifth four bits of the presented pattern on the first cycle although it has no information yet about which pattern it is viewing. These bits divide the patterns into four sets, as shown in FIG. 4(b): 1 and 5; 3 and 4; 2 and 7; and 6. On the second cycle the network looks at the second four bits for patterns 2, 3, 4, and 6 and the third four bits otherwise. Although this is not the optimal strategy given infinite resources, its strategy is good enough to accomplish the task. The number of cycles required for communicating among network elements, processing and sensor costs, and the limited number of network elements and afferents may prevent the network from achieving an optimal solution. Because the network is rewarded for each pattern identified rather than for identifying all seven patterns, an adequate strategy may be to identify some of the patterns while reducing the processing costs likely to be incurred for finding the optimal strategy.

The dynamic programming network and method of the invention offers an alternative or collateral strategy to the use of function approximators for maintaining state values derived via dynamic programming. It intelligently directs sensors toward regions of interest within a state, processing and retaining only information that contributes to the achievement of an objective. This strategy minimizes sensor usage and volume of data processed and conserves memory. Additionally, the dynamic programming network and method integrates sensor management, sensor fusion, and application functions seamlessly in a homogeneous network of elements which divide the application into multiple subtasks that can be assigned to the processors of a fine-grained parallel computer. As the task is distributed among more processors, the network may attain the objective more efficiently. Finally, the dynamic programming network is designed for applications in which the desired responses are unknown, but when trained to accept via its sensors an error or desired response and using a function approximator to maintain state values, it may compare favorably with error-backpropagation neural networks even when tested in states the network has never experienced.

While the apparatus and method herein described constitute a preferred embodiment of the invention, it is to be understood that the invention is not limited to this precise form of apparatus or method and that changes may be made therein without departing from the scope of the invention which is defined in the appended claims.

I claim:

1. An efficient, memory conserving, application integrating dynamic programming method comprising the steps of:

establishing a prototype element of a network, said establishing comprising the steps of:

assigning a table or function approximator for maintaining state values;

identifying a method for determining element state based on state values maintained from said assigning step;

applying a process for dynamically programming said element's state values based on succeeding state values resulting from said element's state from said identifying step;

connecting a plurality of elements from said establishing step to form a network;

coupling signal transmitting sensors to elements from said connecting step;

coupling elements from said connecting step to effectors;

maintaining within each element a running average of values for the state of an element in a cycle after such value occurs;

cycling said network by determining the state of all elements and sensors therein, electing as each element's state the highest running average value from said maintaining step;

sending an output signal to network effectors; and presenting to said sensors a pattern based on a state that results from effector activity from said sending step.

2. The efficient, memory conserving, application integrating dynamic programming method of claim 1 wherein said establishing step further comprises the step of initializing state values.

3. The efficient, memory conserving, application integrating dynamic programming method of claim 1, wherein said connecting step further comprises the step of connecting in a preselected pattern a plurality of elements and sensors from said establishing step to form a network.

4. The efficient, memory conserving, application integrating dynamic programming method of claim 1 wherein said connecting step further comprises the step of connecting in a random pattern a plurality of elements from said establishing step to form a network.

5. The efficient, memory conserving, application integrating dynamic programming method of claim 1 wherein said maintaining step further comprises the step of updating state values by processing the mathematical formula $$V(\vec{x}_{t-1}, u_t) \Leftarrow$$

$$\beta V(\vec{x}_{t-1}, u_t) + \alpha \Big( C(\vec{x}_{t-1}, u_t) + P(\vec{x}_{t-1}, u_t) + R(\vec{x}_{t-1}, u_t) + \gamma \max_u V(\vec{x}_t, u_{t+1}) \Big)$$

where α represents learning rate, β (e.g., 1-α) represents an averaging factor, t represents the number of the current cycle, (C) represents costs, (P) represents penalties levied, (R) represents rewards conferred, (γ) represents a discounting factor and $$\max_u(V)$$

represents the highest value among the element's possible states ($u$).

6. The efficient, memory conserving, sensor management, sensor fusion and application integrating dynamic programming network of claim 1 wherein said maintaining step further comprises the use of other forms of dynamic programming from the group consisting of Q-learning, TD-lamda, value iteration, and advantage learning.

7. The efficient, memory conserving, application integrating dynamic programming method of claim 1 further including, after said cycling step, the step of running a trial of one or more cycles through said network.

8. The efficient, memory conserving, application integrating dynamic programming method of claim 1, said presenting step further comprising the step of multiplexing binary states of said identifiers to determine network response.

9. The efficient, memory conserving, application integrating dynamic programming method of claim 1 further including, after said presenting step, the step of
  engaging said network in a training exercise comprising the steps of:
    applying the network to a simulated or real task;
    cycling said network, allowing effectors to act upon the state of the application; and
    rewarding or penalizing the network based on said effector actions.

10. An efficient, memory conserving, application integrating dynamic programming network comprising:
  a prototype element of said network comprising:
    a state value maintaining function approximator;
    an element state determining program based on said state values;
    a process for dynamically programming said element's state values based on succeeding state values resulting from said element's states;
  a network forming plurality of said prototype elements connected together, signal transmitting sensors connected to said elements;
  said elements connected to effectors;
  a plurality of running average values for a state of each of said elements, said running average value maintained within each element and based on a state of an element in a cycle after such value occurs;
  highest running average value selecting means for each of said elements; and
  a pattern output from said network to network effectors based on said highest running average value of said elements.

11. The efficient, memory conserving, application integrating dynamic programming network of claim 10 wherein said network effectors are randomly connected to said elements.

12. The efficient, memory conserving, application integrating dynamic programming network of claim 10 wherein said signal transmitting sensors are randomly connected to said elements.

13. The efficient, memory conserving, application integrating dynamic programming network of claim 10 further including running average value updating processing means including the mathematical formula $$V(\vec{x}_{t-1}, u_t) \Leftarrow$$

$$\beta V(\vec{x}_{t-1}, u_t) + \alpha \Big( C(\vec{x}_{t-1}, u_t) + P(\vec{x}_{t-1}, u_t) + R(\vec{x}_{t-1}, u_t) + \gamma \max_u V(\vec{x}_t, u_{t+1}) \Big)$$

where α represents learning rate, β (e.g., 1-α) represents an averaging factor, t represents the number of the current cycle, (C) represents costs, (P) represents penalties levied, (R) represents rewards conferred, (γ) represents a discounting factor and $$\max_u$$

(V) represents the highest value among the element's possible states ($u$).

14. The efficient, memory conserving, application integrating dynamic programming network of claim 10 wherein said plurality of running average values for a state of each of said elements is maintained by a method from the group consisting of Q-learning, TD-lamda, value iteration, and advantage learning.

15. The efficient, memory conserving, application integrating dynamic programming network of claim 10 further including a reward applied to said state value of said element for successfully achieving a goal, said reward increasing both said highest running average value for each element and associated chances of selection by said network.

16. The efficient, memory conserving, application integrating dynamic programming network of claim 10 further including a penalty applied to said state value of said element(s) for failing to achieve a goal, said penalty decreasing both said highest running average value for each element and associated chances of selection by said network.

17. The efficient, memory conserving, application integrating dynamic programming network of claim 10 further including a cost applied to said state value of said element to signify the energy or other expenditure to move from one task state to another.

* * * * *